US006272764B1

United States Patent
Lin

(10) Patent No.: US 6,272,764 B1
(45) Date of Patent: Aug. 14, 2001

(54) TAPE RULE

(75) Inventor: Henry Lin, Taipei (TW)

(73) Assignee: Index Measuring Tape Co., Ltd., Taipei (TW)

( * ) Notice: Subject to any disclaimer, the term of this patent is extended or adjusted under 35 U.S.C. 154(b) by 0 days.

(21) Appl. No.: 09/520,634

(22) Filed: Mar. 7, 2000

(51) Int. Cl.$^7$ ................................ G01B 3/12; G01B 7/04
(52) U.S. Cl. .................................................. 33/767; 33/771
(58) Field of Search ............................. 33/767, 771, 755; 242/396.7, 107.2

(56) References Cited

U.S. PATENT DOCUMENTS

| | | | | |
|---|---|---|---|---|
| 3,942,738 | * | 3/1976 | Rutty | 242/107.2 |
| 4,976,048 | * | 12/1990 | Blackman | 33/767 |
| 5,575,077 | * | 11/1996 | Jung Tae | 33/771 |
| 6,026,585 | * | 2/2000 | Li | 33/755 |
| 6,115,933 | * | 9/2000 | Li | 242/396.7 |
| 6,161,299 | * | 12/2000 | Lin | 33/767 |

* cited by examiner

*Primary Examiner*—John S. Hilten
*Assistant Examiner*—Mylinh T Tran
(74) *Attorney, Agent, or Firm*—Dougherty & Troxell

(57) ABSTRACT

Disclosed herein is a tape rule comprising a housing 1, a measuring tape (abbreviated as tape only) 2, a reel 3 for the tape 2 to wind around, a spring 4 for winding the tape 2 back to the reel 3, an arc shaped strap 12 disposed at the periphery of the reel 3 to be freely slidable therearound, a stopper 11 including a push button 13 exposed outside of the housing 1, and a claw 14 for locking the tape 2 pulled out of the housing 1 at an end to of the stopper 11. Furthermore, a brake shoe 15 is integrally formed at the inner surface of the arc shaped strap 12 of the stopper 11 for releasing the locking state made by the claw 14 so that when the tape 2 is automatically winding back around the reel 3 by a resilient force of the spring 4. The tape 2 may be made in contact with the edge of the reel 3 to reduce its retracting speed through pushing the push button 13 towards the radius center of the reel 3.

1 Claim, 6 Drawing Sheets

TAPE RULE

BACKGROUND OF THE INVENTION

1. Field of the Invention

The present invention relates to a tape rule, and more particularly, to a tape rule having a locking mechanism for fixing a drawn out measuring tape, and a brake shoe for reducing the winding back speed of the measuring tape together.

2. Description of the Prior Art

Most of conventional tape rules are generally equipped with springs in housings for winding back measuring tapes. For such a tape rule, in order to prevent a sudden re-winding of the tape on duty by a spring function, a locking mechanism is usually provided to lock the drawn out tape at its position. A tape rule disclosed in Japan Patent No. Shio 51-56664 is a typical example.

Meanwhile, such a tape rule is dangerous due to resilient force of the spring that the tape is apt to beat the user's hand when it is winding back into the housing after the measuring work is finished. For a remedy, a speed reducing device for re-winding tape is provided as disclosed by following four Japanese patents Hei No. 10-89901, Hei 6-28601, 3014697, and Hei 10-232102.

It is preferable that both locking mechanism and brake device are provided together using a common push button for simplifying operation. A tape rule with such structure was disclosed in Japanese Patent Sio No. 59-47802. However, in this example, locking mechanism and brake device are formed by individual device and assembling two parts together such that the push button of the locking mechanism can be used to operate the brake device. As a result, the entire structure of a tape rule becomes so complicated with a lot of parts involved that the cost and fault rate are increased. In addition, in a known tape rule constructed as such whose brake device is functional from the beginning and only operative to release the brake function later will make the user hard to control tape retraction speed according to his/her will.

SUMMARY OF THE INVENTION

Accordingly, it is an object of the present invention to provide a tape rule having a locking mechanism for fixing a drawn out tape and a brake device for reducing the winding back speed of a tape together operative with one common push button so that the user himself/herself may control speed of tape retraction with the result that the structure for the structure is simplified by reduced parts, and cost is saved with decreasing fault rate which prolongs the lifetime of a tape rule.

To achieve the above mentioned object, gist of the present invention is directed to provide a tape rule which comprises a housing 1, a measuring tape (abbreviated as tape only) 2, a reel 3 for the tape 2 to wind around, a spring 4 for winding the tape 2 back to the reel 3, an arc shaped strap 12 disposed at the periphery of the reel 3 to be freely slidable therearound, a stopper 11 including a push button 13 exposed outside of the housing 1, and a claw 14 for locking the tape 2 drawn out of the housing 1 at an end of the stopper 11. Furthermore, a brake shoe 15 is integrally formed at the inner surface of the arc shaped strap 12 of the stopper 11 for releasing the locking state made by the claw 14 so that when the tape 2 is automatically winding back around the reel 3 by a resilient force of the spring 4. The tape 2 may be made in contact with the edge of the reel 3 to reduce its retracting speed through pushing the push button 13 towards the radius center of the reel 3.

DETAILED DESCRIPTION OF THE PREFERRED EMBODIMENT

Hereinafter, the best mode for carrying out the present invention will be described more fully below with reference to attached drawings.

Figure 1:
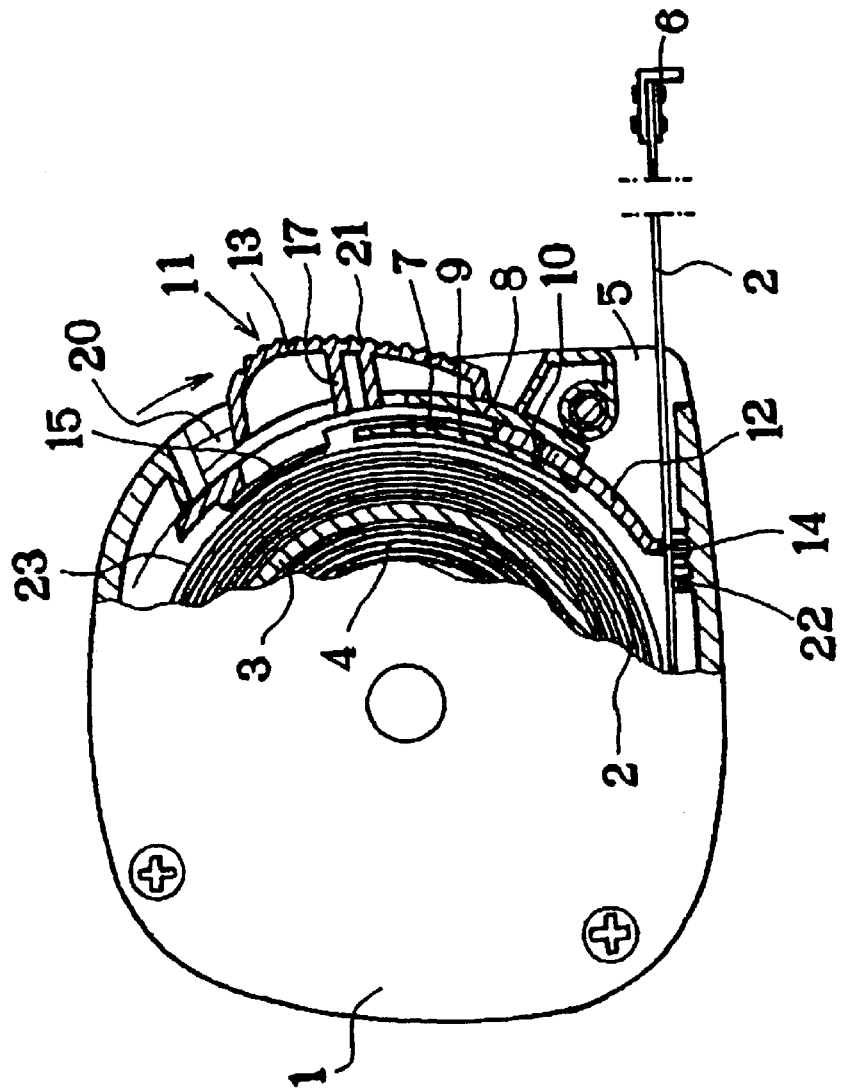
FIG. 1 is a fragmentarily sectionalized side view of the tape rule according to the present invention whose tape is in locked state.
Figure 2:
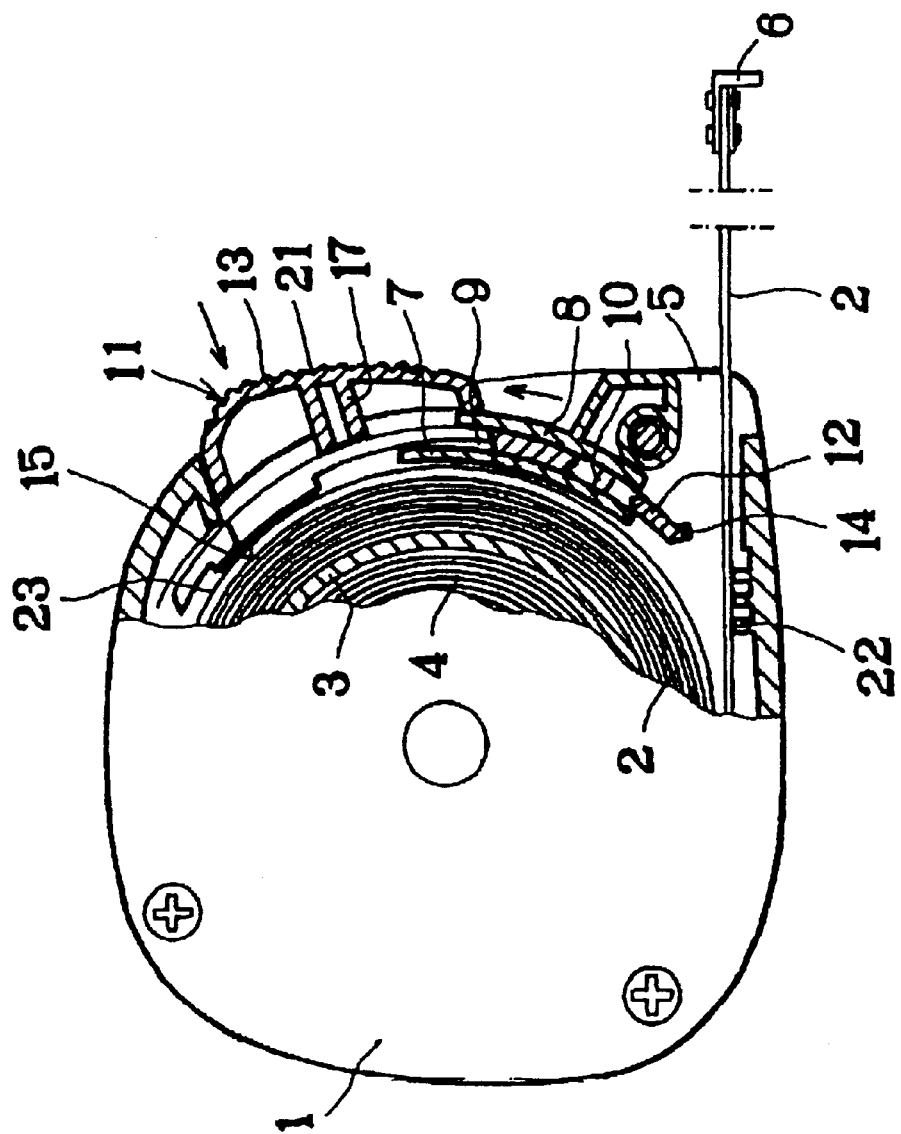
FIG. 2 is a fragmentarily sectionalized side view of the tape rule according to the present invention whose reel rotation speed is reduced.
Figure 3:
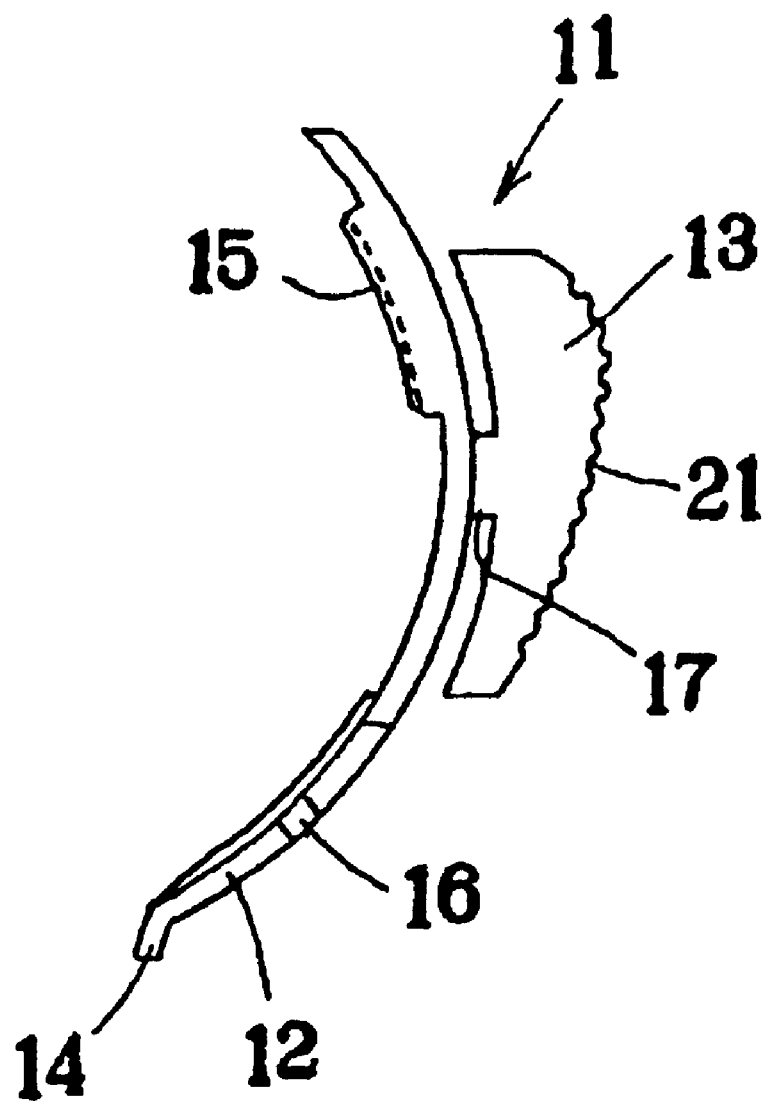
FIG. 3 is a side view of the stopper of the tape rule according to the present invention.
Figure 4:
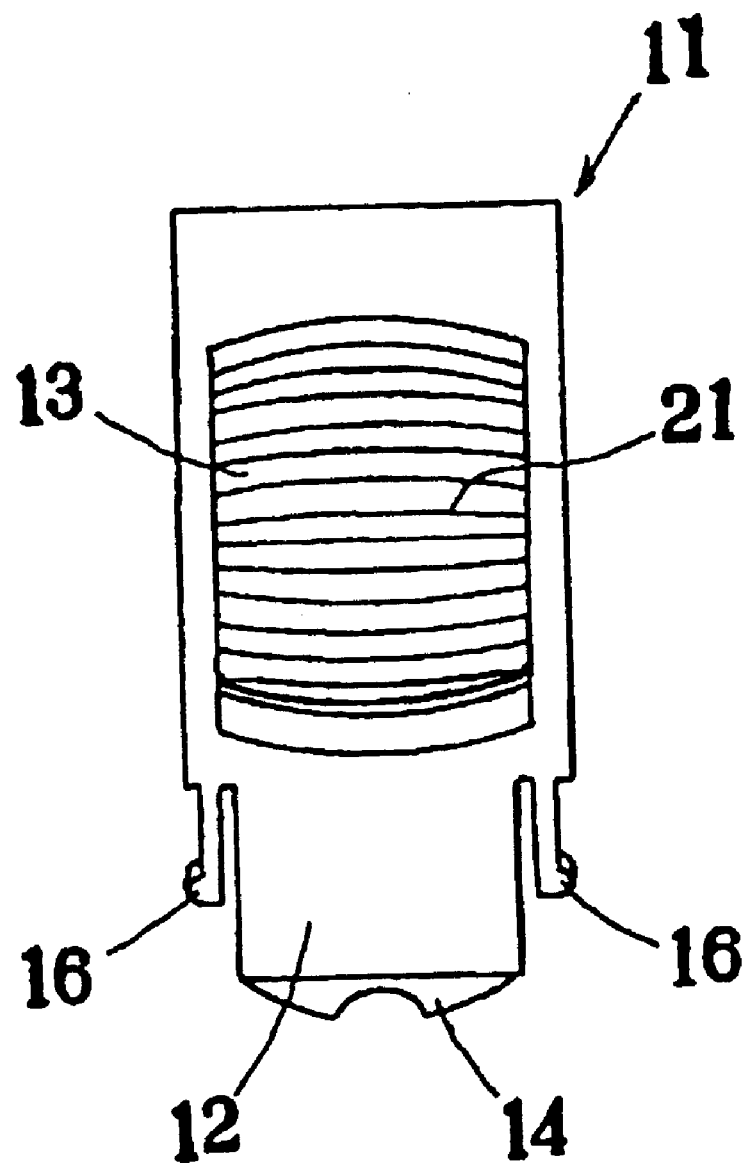
FIG. 4 is a front view of the stopper of the tape rule according to the present invention.

As shown in FIGS. 1 and 2, a reel 3 is provided in a housing 1 with freely rotatable state wound by a tape 2 therearound, and a spring 4 for energizing the tape 2 to retract and re-wind around the reel 3 is provided in inner side of the reel 3.

A tape exit 5 is provided on a portion of surrounding wall of the housing 1 from where the tip of the tape 2 wound around the reel 3 is exposed. A metallic hook 6 is formed on the tip of the tape 2 for hooking on the lip of the exit 5.

A pair of curved wall surfaces 7, 8 are formed in the housing 1 flexed co-axially around the reel 3, and a guide groove 9 is interposed between the curved wall surfaces 7, 8. Furthermore, there is a detaining rib 10 formed in the guide groove 9.

A stopper 11 provided in the housing 1 around the reel 3 is disposed such that it is freely slidable towards the periphery of reel 3. As shown in FIGS. 3 to 6, the stopper 11 is constituted by an arc shaped strap 12, a push button 13 protrudedly disposed on the outer side, i.e. on upwardly concaved side of the arc shaped strap 12, a locking claw 14 flexing outwardly formed at one end of the arc shaped strap 12, a rib type brake shoe 15 installed on inner side, i.e. on downwardly concaved side of the arc shaped strap 12, and a pair of detaining ears 16 formed at both edges of the arc shaped strap 12, these parts can be integrally formed of plastics.

Figure 5:
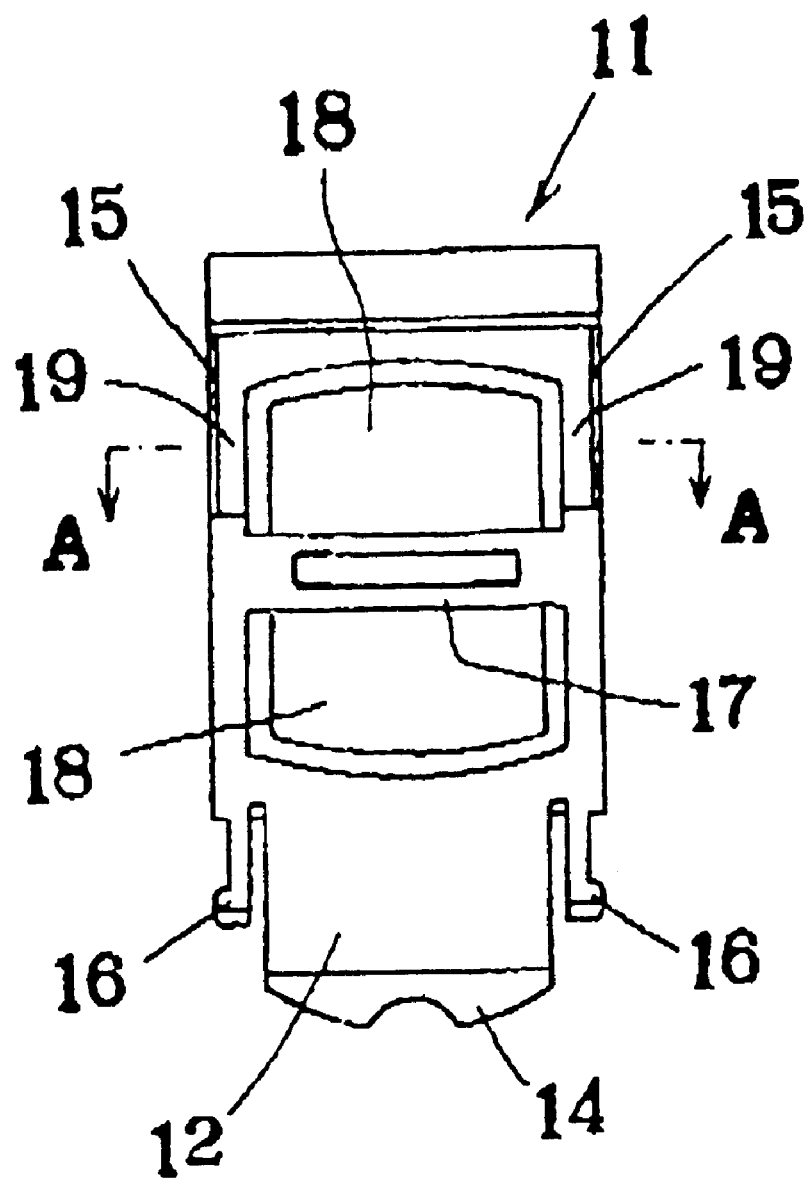
FIG. 5 is a rear view of the stopper of the tape rule according to the present invention.
Figure 6:
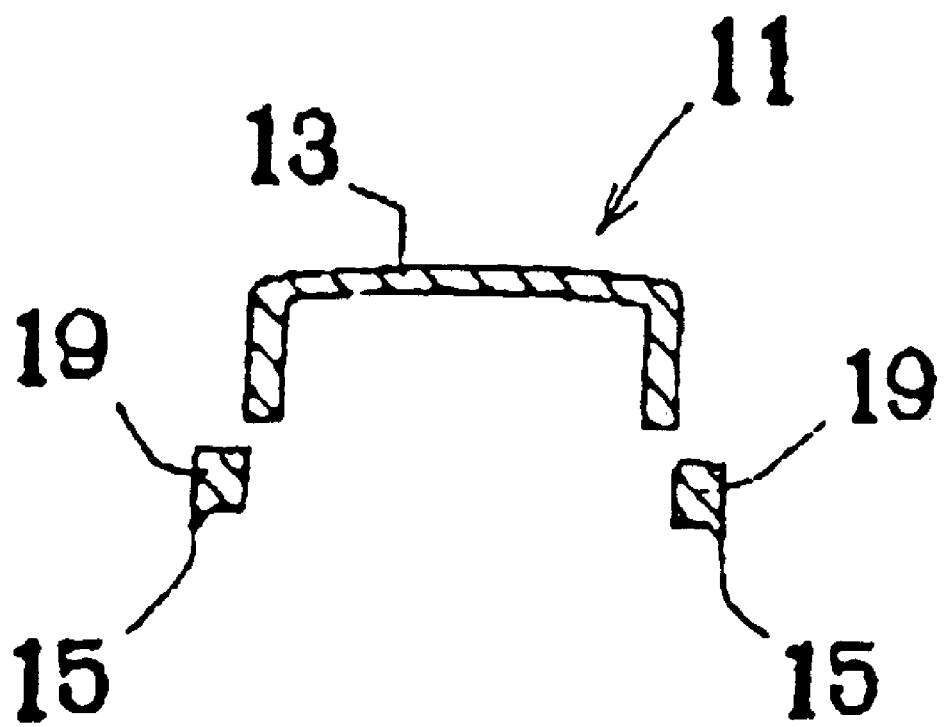
FIG. 6 is a cross sectional view cut along line A—A of FIG. 5.

Meanwhile, as shown in FIG. 5, the neck 17 of the push button 13 provided on the arc shaped strap 12 have a pair of holes 18 at both sides thereof A frame 19 encircling the hole 18 is formed of material apt to elastically deform so that the brake shoe 15 is installed striding on both ends at inner side of the frame 19.

The stopper 11 lays a portion of its arc shaped strap 12 in the guide groove 9 formed in the housing 1, while installs its push button 13 such that it is exposed out of the housing 1 from a window 20 provided at the surrounding wall of the housing 1. A rugged portion 21 is formed at the head of the push button 13 for slip interference.

As described above, as the push button 13 is pushed by the user's finger, the stopper 11 is made to slide towards the periphery of the reel 3. As shown in FIG. 1, when the stopper slides to one direction, one end of the arc shaped strap 12 is released from the reel 3 carrying the tape 2 to approach the tape exit 5 formed on the housing 1, and the claw 14 formed at that end urges the tape 2 against the surrounding wall of the housing 1 and fixes it thereon.

Furthermore, at the place on the surrounding wall of the housing 1, where the tape 2 is fixed, a plurality of ribs 22 are disposed in an equal spacing perpendicular to the longitudinal direction of the tape 2 thereby preventing it from slipping.

As the tape 2 is fixed by the claw 14 of the stopper 11, the detaining ear 16 of the stopper 11 is engaged to the rib 10 on the housing 1 thereby the tape 2 mat be maintained in a state of being locked by the claw 14 of the stopper 11. Then the survey or measuring work can be performed with the tape rule held in this state until the work is finished, and then the tape 2 is retracted into the housing 1.

As shown in FIG. 2, when the tape 2 is to be retracted, the push button 13 can be pushed towards the opposite direction, and of course, the arc shaped strap 12 also slides towards the opposite direction so as to separate the claw 14 from the tape 2 thereby releasing the tape 2 from its locked state.

After the locking state of the tape 2 is released, the tape pulled out from the housing 1 is automatically wound back around the reel 3 by the resilient force of the spring 4. However, there exists a worry that rewinding speed may be too rapid owing to a large acceleration force produced by the spring 4. In this case, as shown in FIG. 2, the push button 13 of the stopper 11 may be pushed towards the center of the reel 3 along its radius so as to flex the arc shaped strap 12 inwardly thereby bringing the brake shoe 15 in contact with the outer periphery of a disc like side plate 23 provided at both sides of the reel 3. Such that, when the push button is slightly pushed toward the center of the reel 3, the rotation of the reel 3 is de-accelerated by a friction force produced therefrom so as to achieve the effect of re-winding the tape 2 slowly and securely. When the push button is heavily pushed toward the center of the reel 3, then the friction increased, the tape 2 would then temporarily stopped.

Here, the tape rule of the present invention are characterized in that since the claw 14 of the stopper 11 can lock the tape 2 being pulled out from the housing 1 so as to facilitate performing measuring work and de-accelerate the re-winding speed of the tape 2, and the function of temporarily stopping the tape 2 by using the brake shoe 15. Moreover, since the claw 14 and the brake shoe 15 are integrally formed with the arc shaped strap 12 of the same stopper II so as to simplify the construction, reducing the amount of parts, minimizing the cost and decreasing the fault rate. In addition, locking the tape 2 by the claw 14, releasing the locking state thereof, the temporarily stopped tape 2 is then rewound, and de-accelerating re-winding speed of tape 2 by brake shoe 15 using only single push button 13 are the significant advantages which make the tape rule of the present invention easy to handle and convenient to use.

While the present invention has been particularly shown and described with reference to a particular embodiment thereof, it will be understood by those skilled in the art that various changes in form and detail maybe effected therein without departing from the spirit and scope of the invention as defined by the appended claims.

What is claimed is:

1. A tape rule comprising a housing 1, a measuring tape 2, a reel 3 for said tape 2 to wind around, a spring 4 for winding said tape 2 back to said reel 3, an arc shaped strap 12 disposed at the periphery of said reel 3, said trap is freely slidable therearound said reel, a stopper 11 including a push button 13 extending outside of said housing, and a claw 14 for locking said tape 2 pulled out of said housing 1, said claw located at an end of said stopper 11 for placing the tape into a locking state, the tape rule further comprising, a brake shoe 15 being integrally formed at the inner surface of said arc shaped strap 12 of said stopper 11 for releasing the locking state made by said claw 14 so that when said tape 2 is automatically re-winding around said reel 3 by a resilient force of said spring 4, said tape 2 in contacts with the edge of said reel 3 to temporarily stop the tape and reduce its retracting speed through pushing said push button 13 towards the radius center of said reel 3.

* * * * *